Patented Jan. 29, 1924.

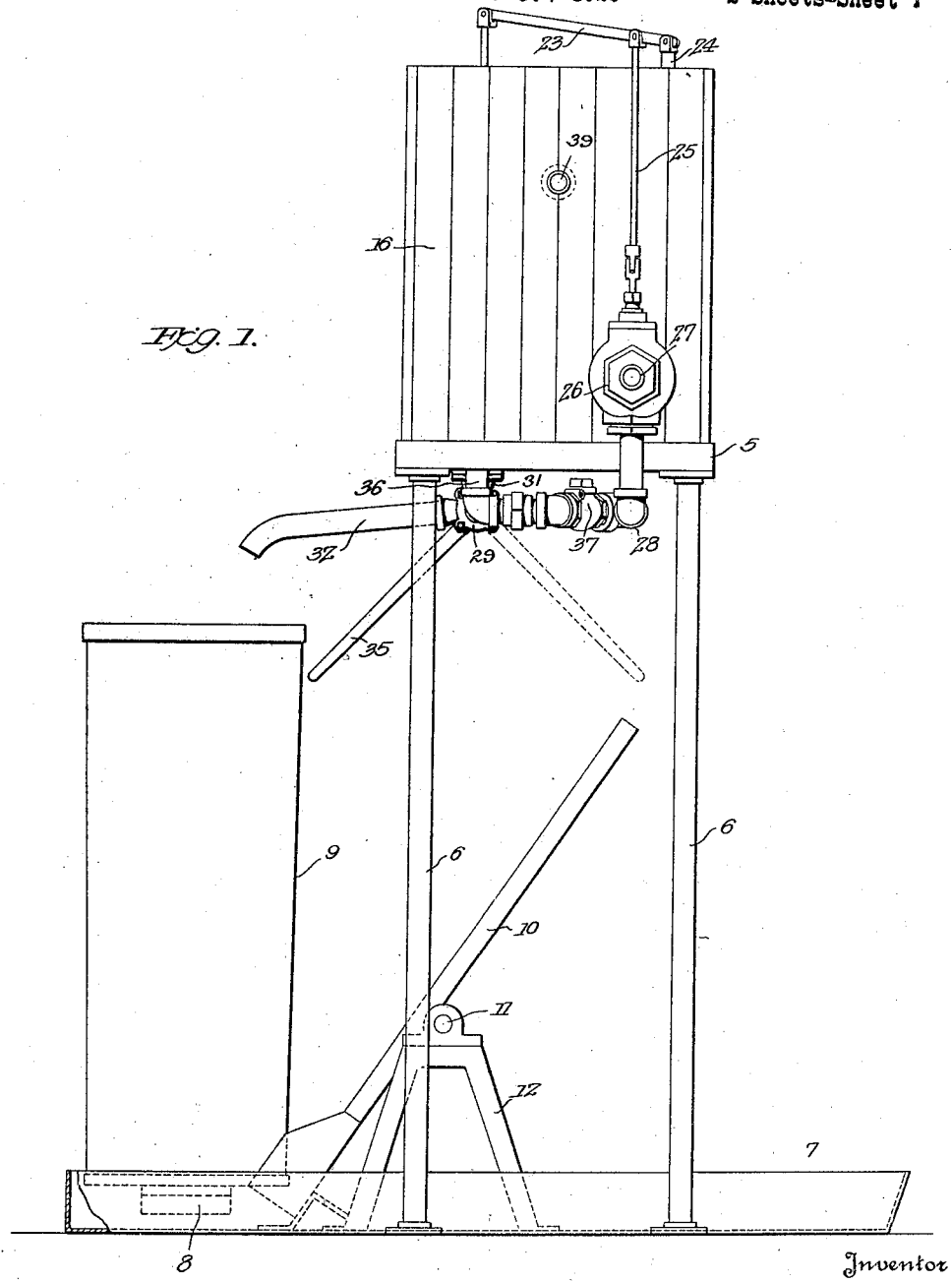

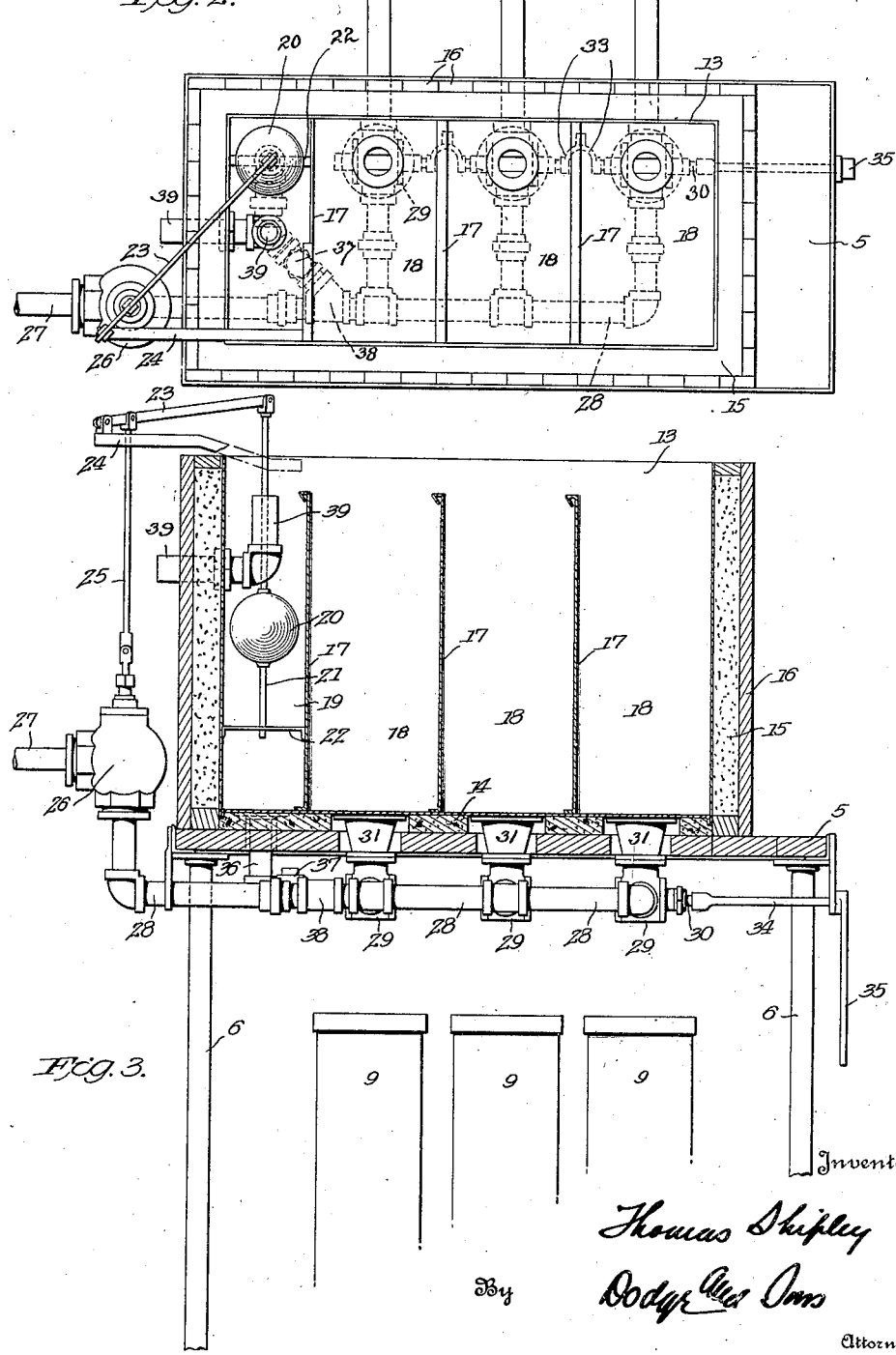

1,482,157

UNITED STATES PATENT OFFICE.

THOMAS SHIPLEY, OF YORK, PENNSYLVANIA.

MEASURING CAN FILLER.

Application filed June 30, 1923. Serial No. 648,813.

*To all whom it may concern:*

Be it known that I, THOMAS SHIPLEY, a citizen of the United States, residing at York, in the county of York and State of Pennsylvania, have invented certain new and useful Improvements in Measuring Can Fillers, of which the following is a specification.

This invention relates to liquid measuring devices, and particularly to a multiple can filler of the float controlled, semi-automatic type.

The device is intended to deliver measured charges of pre-cooled water into the freezing cans in a can ice plant and though available for other uses, possesses particular utility in this field because of the special requirements to be met.

In such plants the water is commonly distilled or chemically treated, to purify it, and is then pre-cooled nearly to the freezing point. Hence this water as it arrives at the can filler has considerable intrinsic value and should be protected against heat absorption and needless waste. The requirements of storage impose close limits on the size of the ice blocks and hence demand accurate measurement. Rapid operation is essential to preclude losses by heat absorption and to meet occasional peak demands. Rough usage and the customary use of cheap labor demand rugged construction and the utmost attainable simplicity.

These conditions I have met by the use of a plurality of measuring chambers arranged to have a common overflow into a float chamber. The accumulation of a substantial quantity of water in the float chamber automatically cuts off the feed to the measuring chambers. The parts are so arranged that the water accumulated in the float chamber is withdrawn and fed to the measuring chambers on the next succeeding filling thereof. Hence no water is wasted.

The only moving parts are an ordinary float valve, an ordinary check valve, and a series of connected three-way valves, one for each measuring chamber.

A preferred embodiment of the invention for the purpose mentioned and designed to fill three cans at one time is illustrated in the accompanying drawings, in which—

Fig. 1 is an end elevation of the complete device, looking from the left with reference to Figs. 2 and 3;

Fig. 2 is a plan view with the drip pan omitted; and

Fig. 3 is a vertical longitudinal section with the supports partly broken away.

The measuring device proper is supported on a platform 5 which rests on pipe stanchions 6 above a drip pan 7 which may be connected to a drain if desired.

Also mounted above the drip pan 7 is a row of slightly elevated can supports 8, one for each can. The cans 9 rest on these supports in position to be engaged by the lower ends of corresponding can dumps 10 which are pivoted on a rod 11 carried by the upstanding brackets or frames 12.

The parts so far described are merely ancillary features subject to considerable variation. The arrangement described is preferred because it provides a single station where the cans are dumped and then refilled without intermediate handling.

A rectangular tank 13 rests on an insulating layer 14 of cork board, which in turn is supported by the platform 5. The sides of the tank 13 are insulated with granulated cork 15 confined by tongue and groove sheathing 16.

The tank 13 is divided by three partitions 17 into four chambers, three of which, indicated by the reference numeral 18, are measuring chambers of equal volume, and the fourth of which, indicated by the reference numeral 19, is the so-called float chamber. The chamber 19 is preferably but not necessarily smaller in volume than the chambers 18. The top edges of the partitions 17 are all horizontal and are all at the same horizontal level a few inches below the top of the tank 13 so that when the chambers 18 are all filled a common overflow is afforded over the tops of the partitions to the float chamber 19.

Mounted in the float chamber 19, preferably about half way between the top and bottom thereof, is a float 20 mounted on a vertical rod 21. The rod 21 is guided at its lower end by a float guide 22 and is pivoted at its upper end to a float lever 23. The float lever 23 is pivoted on a bracket 24 supported by the tank 13 and is connected by a valve rod 25 to operate the valve member of a float valve 26. The parts are so arranged that the rise of the float 20 closes the valve 26.

The valve 26 receives water through a pipe 27 and delivers it to a manifold pipe or connection 28 which extends beneath the platform 5 and hence below the three measuring chambers 18.

Below each measuring chamber 18 the manifold pipe 28 is fitted with a corresponding three-way valve 29. The valve stems 30 of the three valves are aligned and each valve is so constructed that it serves to connect the corresponding measuring chamber 18 through a nipple 31 alternatively with the manifold 28 or with a corresponding discharge spout 32 according to the position of the valve plug.

The various discharge spouts 32 are so located as to discharge water from corresponding measuring chambers 18 into corresponding ice cans 9. The valve stems 30 extend through the valves and the stems of adjacent valves are connected together by the interengagement of the curved arms 33 shown in Fig. 2. In this way, all of the valves are connected together to move as a unit and all are actuated in unison through the valve actuator shaft 34 and handle 35.

The nipple 36 leads from the bottom of the float chamber 19 to a check valve 37 which opens in the direction of flow from the measuring chamber 19 and closes against reverse flow. The check valve 37 discharges through a 45° Y-fitting 38 into the manifold 28. The Y-fitting 38 forms a component part of the manifold and is interposed between the float valve 26 and the three-way valves 29.

The fitting 38 is so arranged that the flow from the float chamber into the Y-fitting is in the general direction of flow through the manifold 28 to the measuring chambers 18. This produces an ejector effect caused by rapid flow of water in the manifold 28 and acting to withdraw water from the float chamber 19.

An overflow connection 39 leads from the float chamber 19 and is arranged to operate only if the chamber 19 is filled to the top of the partition 17. This overflow does not function in the ordinary operation of the device but is designed to carry off excess water if the float 20 should fail to close the valve 26. For this reason the overflow 39 is made large enough to discharge all the water which can be delivered to the tank through the valve 26.

Assume that the valve handle 35 is in the forward position indicated in full lines in Fig. 1 and that the measuring chambers are nearly filled by flow through the manifold 28, the three-way valves 29 and the nipples 31.

The measuring chambers 18 will fill substantially simultaneously and the levels in the different chambers will tend to equalize because of flow over the tops of partitions 17 if any chamber fills in advance of the others. At or about the time that all the chambers are full, water will commence to overflow into the chamber 19 and as the water rises in the chamber 19 a level will be reached sufficiently high to raise the float 20 and close the valve 26.

Under these conditions the back pressure in the manifold 28 caused by the static head in the chambers 18 will be sufficient to hold the check valve 37 closed against the lower static head in the chamber 19. When the valve 26 has closed, the measuring device may be allowed to stand with the valve handle 35 in its forward position without danger of any change of level in the chambers 18 or 19. In the meantime a group of ice filled cans will have been placed on the can supports 8, will have been dumped on the can dumps 10, and then restored in an empty condition to position on the can supports 8.

The valve handle 35 is then swung to the rear position shown in dotted lines in Fig. 1. This cuts off the connection from the manifold 28 to the measuring chambers 18 and places these chambers in direct communication with the discharge spouts 32 so that each measuring chamber discharges its measured contents into a corresponding can 9.

As soon as the measuring chambers 18 have emptied, the valve handle 35 is again swung to its forward position cutting off the communication from the measuring chambers 18 to the spouts 32 and restoring communication from the manifold 28 to the various measuring chambers 18

The rapid flow through the manifold 28 assisted by the static head in the chamber 19 induces a rapid flow of water from the float chamber 19 through the check valve 37 and into the manifold 28. This flow is sufficiently rapid to drain the float chamber 19 completely or substantially so before the rising static head in the measuring chambers 18 exerts sufficient back pressure to close the check valve 37. The cycle of operations above described is repeated for each group of cans.

It will be observed that the device is simple and rugged in construction and includes very few moving parts. The tank is insulated to prevent the absorption of heat but it is contemplated that the measuring chambers will not be filled until just before the time when the water is needed to fill a group of cans. To secure satisfactory operation in this way, all the water passages are made large so that the flow to the chambers is rapid.

What is claimed is:

1. In a liquid measuring device, the combination of a measuring chamber having an overflow; a valve mechanism serving to control the alternate filling and emptying of said chamber; means operable by liquid passing said overflow and serving to terminate the filling flow to said chamber; and a connection controlled by said valve mechanism and serving to return the overflowed liquid to the measuring chamber as the latter starts to fill.

2. In a liquid measuring device, the combination of a measuring chamber having an overflow; a valve mechanism serving to control alternate filling and emptying of said chamber; an overflow receptacle adapted to receive the liquid overflowing from said chamber; means controlled by the accumulation of liquid in said receptacle serving to cut off the supply of liquid from the source to said valve mechanism; and a check valve arranged to permit flow from the overflow receptacle to the chamber under the control of said valve mechanism, while preventing reverse flow.

3. In a liquid measuring device, the combination of a measuring chamber having an overflow and a discharge; a valve mechanism serving in one condition to direct liquid from a source to said chamber and close said discharge, and in another condition to open said discharge and shut off the supply of liquid to the chamber; an overflow receptacle adapted to be fed by the overflow from said measuring chamber; an automatic cut-off for the liquid flowing from said source to said chamber and operable by the accumulation of overflow liquid in said receptacle; and means for draining said overflow receptacle into said measuring chamber after the latter has been emptied and while it is being refilled by liquid from said source.

4. In a liquid measuring device, the combination of a plurality of measuring chambers each having an overflow and a discharge; a valve mechanism serving in one condition to direct liquid from a source simultaneously to all said chambers and close the discharges from said chambers, and in another condition to open said discharges and shut off the supply of liquid to said chambers; an overflow receptacle adapted to be fed by the overflows from said measuring chambers; an automatic cut-off for the liquid flowing from said source to said chambers, and operable by the accumulation of overflow liquid in said receptacle; and means for draining said overflowed liquid from the receptacle into said measuring chambers after the latter have been emptied and while they are being filled by liquid from said source.

5. In a liquid measuring apparatus, the combination of a measuring chamber having an overflow; an overflow receptacle adapted to receive the overflow from said measuring chamber, and in communication with said chamber through a passage; means preventing flow through said passage toward the overflow receptacle; a source of liquid supply; a delivery connection; an automatic valve controlling said source and arranged to be closed by the rise of liquid in said receptacle; and a valve mechanism controlling said passage, and communication between said automatic valve, said chamber and said discharge connection and arranged in one position to open said passage and simultaneously open communication from said automatic valve to said chamber while closing the discharge connection and in another position open the discharge connection and close the others.

In testimony whereof I have signed my name to this specification.

THOMAS SHIPLEY.